Figures 1, 2:
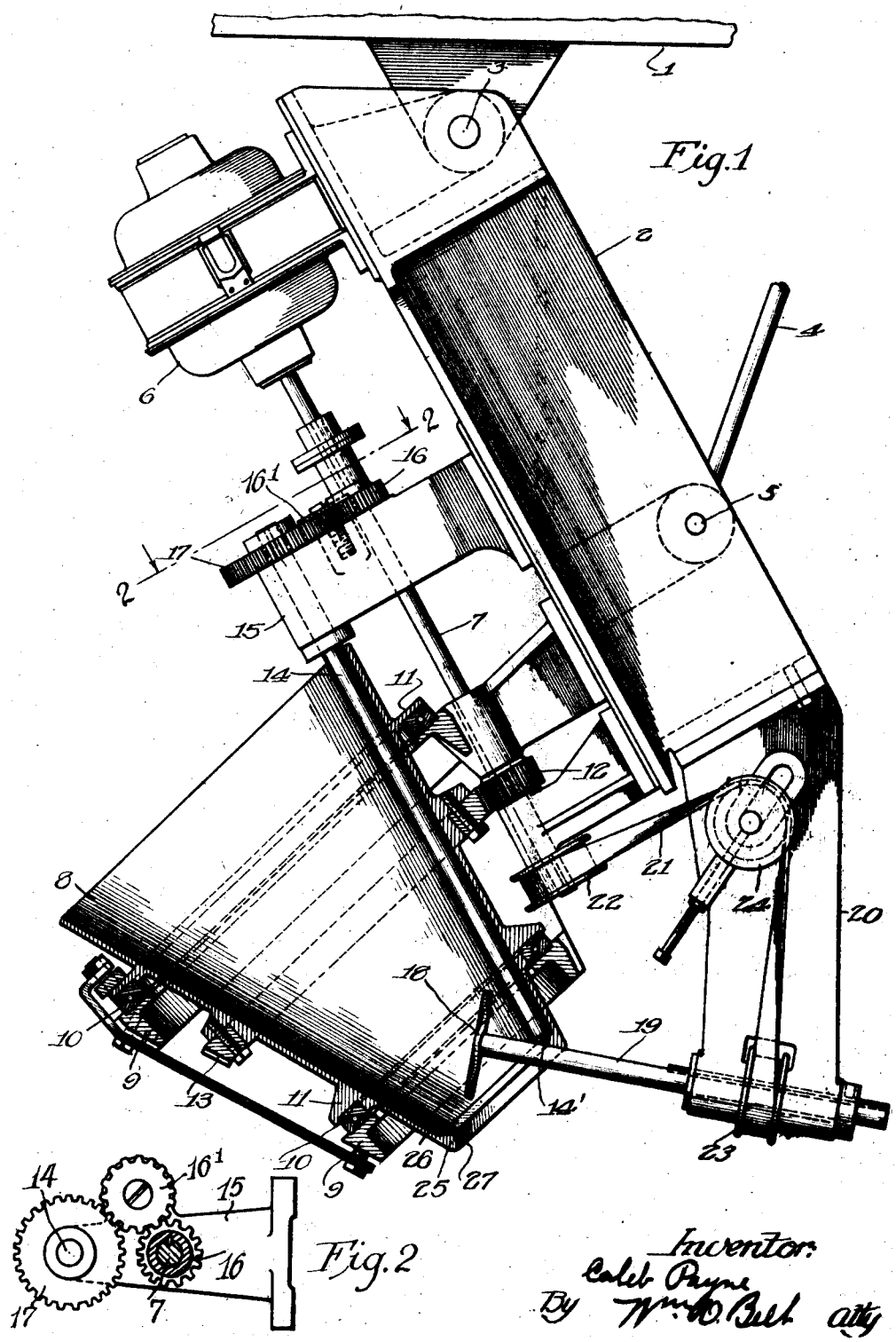

May 10, 1927.

C. PAYNE 1,628,632

CONTINUOUS SELF CLEANING MIXER

Filed May 10, 1926

Inventor:
Caleb Payne
By Wm. D. Bell atty

Patented May 10, 1927.

1,628,632

UNITED STATES PATENT OFFICE.

CALEB PAYNE, OF CHICAGO, ILLINOIS, ASSIGNOR TO GYPSUM ENGINEERING & MANUFACTURING CO., OF CHICAGO, ILLINOIS, A CORPORATION OF ILLINOIS.

CONTINUOUS SELF-CLEANING MIXER.

Application filed May 10, 1926. Serial No. 107,856.

This invention relates to mixing machines and more particularly to a machine for mixing gypsum stucco.

It is a well known fact that gypsum stucco is difficult to mix because of its tendency to build up on the parts with which it contacts, thereby requiring the mixing operation to be discontinued from time to time to permit the parts to be cleaned.

The object of my invention is to provide a machine for mixing gypsum stucco which is automatically self cleaning and which may be operated continuously whereby to facilitate the mixing operation and enable it to be carried on more efficiently and economically than has been customary heretofore.

In the accompanying drawing I have illustrated the invention in a selected embodiment and referring thereto, Fig. 1 is a sectional elevation showing the machine suspended from an overhead support.

Fig. 2 is a sectional view on the line 2—2 of Fig. 1.

Referring to the drawings 1 is an overhead support to which the frame 2 of the mixer is pivoted at 3. All the parts of the machine are mounted on the frame 2 and a rod 4 is connected pivotally or otherwise at 5 to the frame by means of which the frame can be adjusted relative to the support, if desired, or which can be used as a brace for the frame. A motor 6 is mounted on the frame in a suitable manner and the motor shaft 7 is supported in bearings in the frame. A mixing receptacle 8 is supported in rings 9 on the frame and ball bearings 10 are interposed between said rings and annular flanges 11 on the receptacle to facilitate the revolving movement of the receptacle in the rings. A pinion 12 on the motor shaft meshes with a gear 13 on the receptacle to revolve with the receptacle.

A cleaning rod 14 is rotatably mounted in an arm 15 of the frame 2 and projects within the receptacle to the bottom thereof. A pinion 16 on the motor shaft meshes with an idler gear 16' mounted on the arm 15 and meshing with a gear 17 on the cleaning rod to drive the same in a direction opposite to the direction of revolution of the receptacle.

A disk 18 is mounted in the bottom of the receptacle at an angle to the axis of the receptacle on a shaft 19 which is supported in an arm 20 on the frame. A belt 21 is driven by a pulley 22 on the motor shaft and travels on a pulley 23 on the disk shaft to rotate said shaft; said belt also travels over an adjustable pulley 24 mounted on the arm 20. The receptacle is conveniently made conical in shape larger at its top than at its bottom and open at its top and at its bottom. The receptacle is supported in an inclined position and conveniently at or about an angle of 45° from the horizontal. With such an arrangement of the receptacle I have found it convenient to arrange the disk shaft with the disk end slightly elevated above a horizontal plane so that the disk will be supported within the small lower end of the receptacle and in a position adjacent to but slightly inclined backward at its upper edge from a perpendicular plane passing through the lower edge of the open end of the receptacle. The disk shaft will lie closely adjacent to the upper edge of the open lower end of the receptacle and the lower end of the cleaner rod 14 is adjacent to the shaft 19. The disk is rotated at a high rate of speed and operates to cut the stucco mix and discharge it through the open lower end of the receptacle. I prefer to make the disk wavy, as shown, but it may be made flat if desired. Since the disk travels at a high rate of speed it will break up the stucco by centrifugal force into a relatively finely divided condition, and this finely divided stucco will be discharged from the receptacle by reason of this centrifugal force and the resistance offered by the body of stucco in the receptacle.

Under ordinary conditions stucco would build up on the sides of the receptacle until it would practically fill the receptacle. This would necessitate stopping the machine until the receptacle is cleaned which reduces the efficiency of the machine and increases the expense of mixing. But I have provided means for cleaning the inside wall of the receptacle so that it may be kept in continuous operation, and this means comprises the cleaning rod 14 which is arranged within the receptacle in contact with the wall thereof, and is rotated in a direction opposite to the direction of rotation of the receptacle and at a high rate of speed. This rod engages the inner wall of the receptacle at the top thereof when the receptacle is in inclined position and it keeps the wall of the receptacle clean and free from any accumulation of stucco.

It is also important to prevent the stucco from building up at the discharge end of the receptacle and I provide simple means for cleaning the discharge end and keeping it free from accumulation of the material. At the discharge end of the receptacle, on the inside thereof, I provide a flange 25 having an inner bevel 26 and an outer bevel 27. The cleaning rod 14 has a cone shaped end 14' which operates in relation to the inside bevel 26 and also in relation to the shaft 19. This shaft 19 operates in relation to the outside bevel 27. The rod 14 and the shaft 19 may be adjusted to contact with the bevels of the flange 25, or they may be adjusted to operate in such relation thereto that they will keep the discharge end of the receptacle free from accumulation of stucco and the flange comparatively clean. The cone shaped end of the cleaning rod operates at or about contact with the shaft 19 to prevent material from the receptacle traveling along the shaft, and this result is made certain by contact of the flange 25 with the shaft.

My invention is adapted for mixing all kinds of stucco material, including saturated gypsum with or without a filler such as fibre or sawdust. The materials are roughly mixed by the revolution of the receptacle and they are thoroughly mixed by the centrifugal force produced by the revolution of the mixer disk at a high rate of speed. It is, of course, contemplated that suitable means will be provided for delivering the materials into the receptacle and for receiving the materials discharged therefrom, but these form no part of the present invention and it is not considered necessary to illustrate or describe them.

I am aware that changes in the form, construction and arrangement of parts of my invention may be made without departing from the spirit or sacrificing the advantages thereof and I reserve the right to make all such changes as fairly fall within the scope of the following claims.

I claim:

1. A continuous mixer comprising a revoluble mixing receptacle having a discharge opening, and a disk mounted to revolve in said receptacle adjacent the discharge opening and in a plane at an angle to the axis of the receptacle.

2. A continuous mixer comprising a revoluble mixing receptacle having a discharge opening, and a wavy disk mounted to revolve in said receptacle adjacent the discharge opening and in a plane at an angle to the axis of the receptacle.

3. A continuous mixer comprising a revoluble mixing receptacle having a discharge opening, a rotatable shaft projecting through said opening at an angle to the axis of the receptacle, and a disk mounted on the shaft within the receptacle adjacent said discharge opening and revolving in a plane perpendicular to the axis of the shaft and angular to the axis of the receptacle.

4. A continuous mixer comprising a revoluble mixing receptacle of conical shape smaller at its bottom than at its top and open at its bottom, means for supporting said receptacle in an inclined position, a rotatable shaft projecting into the bottom of the receptacle at an angle to the axis of the receptacle, and a disk mounted on the shaft to revolve within the receptacle in a plane substantially intersecting the bottom of the open end of the receptacle but spaced therefrom.

5. A continuous mixer comprising a revoluble mixing receptacle of conical shape smaller at its bottom than at its top and open at its bottom, a rotatable shaft projecting through the open bottom of the receptacle, and a wavy disk mounted on the shaft to revolve within the receptacle in a plane substantially intersecting the bottom of the open end of the receptacle but spaced therefrom.

6. A continuous mixer comprising a revoluble mixer receptacle and a rotatable cleaning rod arranged in contact with the inner wall of the receptacle and rotating in a direction opposite to the direction of rotation of the receptacle.

7. A continuous mixer comprising a revoluble mixer receptacle and a rotatable cleaning rod arranged in contact with the inner wall of the receptacle and rotating in a direction opposite to the direction of rotation of the receptacle and at a higher rate of speed than the rate of speed of revolution of the receptacle.

8. A continuous mixer comprising a revoluble mixing receptacle of conical shape and having a discharge opening at its bottom, means for supporting said receptacle in an inclined position, and a rotatable cleaning rod supported to operate within said receptacle against the wall thereof at the top of the receptacle and in a direction opposite to the direction of revolution of the receptacle.

9. The combination of a revoluble mixing receptacle having a discharge opening at its bottom, a rotatable shaft projecting through said opening, a disk mounted on said shaft to revolve within the receptacle adjacent the bottom thereof and in a plane at an angle to the axis of the receptacle, and a rotatable cleaning rod arranged within the receptacle and engaging the wall thereof at the top of the receptacle.

10. The combination of a revoluble mixing receptacle of conical shape open at its top and bottom and smaller at its bottom than at its top, means for supporting the receptacle in an inclined position, a rotatable shaft projecting into the receptacle through its open bottom, a wavy disk mounted on said shaft to operate within the receptacle adjacent the bottom thereof and in a plane at an angle to the axis of the receptacle, a cleaning rod projecting into the receptacle and engaging the wall thereof from the open top to the open bottom, and means for rotating said rod in a reverse direction to the direction of revolution of the receptacle and at a higher rate of speed.

11. A mixer comprising a revoluble mixing receptacle having a discharge opening, a rotatable shaft projecting into said opening, a disk mounted on the shaft within the receptacle, and a rotatable cleaning rod arranged in contact with the inner wall of the receptacle, one end of said rod operating in relation to said shaft to prevent material from the receptacle traveling on the shaft past the cleaning rod.

12. A mixer comprising a revoluble mixing receptacle having a discharge opening, a rotatable shaft projecting into said opening angularly to the axis of the receptacle, a disk mounted on the shaft within the receptacle, and a rotatable cleaning rod arranged in contact with the inner wall of the receptacle, one end of said rod being cone shaped and operating in relation to said shaft to prevent material from the receptacle traveling on the shaft past the cleaning rod.

13. A mixer comprising a revoluble mixing receptacle having an open discharge end, a bevel flange around said open end on the inside thereof, a rotatable shaft projecting into said opening, and a disk mounted on the shaft within the receptacle, said shaft operating in relation to said bevel flange to keep the open end of the receptacle free for the passage of material from the receptacle.

14. A mixer comprising a revoluble mixing receptacle having an open discharge end, a bevel flange around said open end on the inside thereof, a rotatable shaft projecting into said opening angularly to the axis of the receptacle, a disk mounted on the shaft within the receptacle, said shaft being arranged substantially parallel with the bevel flange and in relation thereto to keep the open end of the receptacle free from the passage of material from the receptacle.

15. A mixer comprising a revoluble mixing receptacle having an open discharge end, a bevel flange around said open end on the inside thereof, a rotatable cleaning rod arranged in contact with the inner wall of the receptacle and rotating in a direction opposite to the direction of rotation of the receptacle, said cleaning rod having a cone shaped end operating in relation to said bevel flange to keep the open end of the receptacle free for the passage of material from the receptacle.

16. A mixer comprising a revoluble mixing receptacle having an open discharge end, a rotatable shaft projecting into said opening, a disk mounted on the shaft within the receptacle, and a rotatable cleaning rod arranged in contact with the inner wall of the receptacle and having a cone shaped end operating in relation to said shaft to prevent material from the receptacle traveling on the shaft past the cleaning rod.

17. A mixer comprising a revoluble mixing receptacle having a discharge opening, a flange around the open end of the receptacle on the inside thereof, said flange being beveled at the top and at the bottom, a rotatable shaft projecting into said opening angularly to the axis of the receptacle, a disk mounted on the shaft within the receptacle, and a rotatable cleaning rod arranged in contact with the inner wall of the receptacle and rotating in a direction opposite to the direction of rotation of the receptacle, one end of said rod being cone shaped and operating in relation to said shaft and the inside bevel of said flange and the shaft operating in relation to the outside bevel of said flange to keep the discharge open end of the receptacle free for the passage of material from the receptacle and to prevent material from the receptacle from traveling beyond the receptacle on the shaft.

CALEB PAYNE.